Dec. 15, 1964   L. E. SMEDLEY   3,161,026
METAL-SOD DAM

Filed March 23, 1961   4 Sheets-Sheet 1

INVENTOR.
Lee E. Smedley

BY
Attorneys

Dec. 15, 1964 L. E. SMEDLEY 3,161,026
METAL-SOD DAM
Filed March 23, 1961 4 Sheets-Sheet 2

INVENTOR.
Lee E. Smedley
BY
Attorneys

Dec. 15, 1964    L. E. SMEDLEY    3,161,026
METAL-SOD DAM

Filed March 23, 1961    4 Sheets-Sheet 3

INVENTOR.
Lee E. Smedley

BY
Attorneys

Dec. 15, 1964     L. E. SMEDLEY     3,161,026
METAL-SOD DAM

Filed March 23, 1961     4 Sheets-Sheet 4

INVENTOR.
Lee E. Smedley
BY
Attorneys

United States Patent Office 3,161,026
Patented Dec. 15, 1964

3,161,026
METAL-SOD DAM
Lee E. Smedley, 5744 Walker Ave., Lincoln 4, Nebr.
Filed Mar. 23, 1961, Ser. No. 97,970
2 Claims. (Cl. 61—3)
(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

This invention relates to a dam for use in drainageways, particularly gullies, on agricultural lands, along railroad and highway rights-of-way, and other places where run-off waters, including irrigation waters or waste waters, may become concentrated, to cause their aggrading and resulting stabilization against erosion, and has among its objects the provision of such a dam which is simple and inexpensive in construction, and which can be rapidly installed in a gully with minimum shaping of the gully blanks. Other objects will be apparent from the description of the invention.

Gullies develop in drainageways, starting at the extreme lower end and work upward. Oftentimes a gully will start to degrade where, at the lower end, the run-off waters drop off over a vertical bank, or where these run-off waters become concentrated and develop an erosive velocity. This degrading continues, starting at the lower end and working upward, until the channel grade is flat enough and has adequate width to provide a cross section that, for the average run-off waters from the drainage area, permits movement of this amount of water down the channel at a non-erosive velocity. When the velocity of flowing water is reduced, its ability to hold soil particles in suspension is greatly reduced and some of these soil particles are dropped to channel floor. By utilizing this basic principle, the present invention can prevent further degrading of gully channels, stabilize existing unstable reaches of a channel, and provide a means of vegetating a channel that is in "regime," that is, one that is alternately "scouring" and "filling."

In general, the invention comprises the combination of a dam with a gully having a bottom and sides to stabilize the gully against erosion from run-off water carrying materials conducive to the growth of vegetation including silt, roots, and organic matter. The dam is installed in the gully to resist the flow of said run-off water thereby to decelerate its velocity and cause a portion of said materials carried thereby to settle out on the gully bottom.

The dam comprises a rigid, open-mesh trapezoidally-shaped bar mat which is positioned in the gully at an acute angle, preferably about 18°, to the gully bottom facing the upstream direction. The shorter base of the bar mat spans the width of, and is anchored to, the gully bottom, while the diagonal sides of the bar mat are set at angles corresponding to the slopes of the gully sides and are anchored thereto.

The dam also provides an open mesh member which covers the bottom and sides of the gully and is anchored thereto. This member is positioned under the bar mat and includes a flume mesh portion extending upstream of the bar mat, and a basin mesh portion extending downstream of the bar mat, the latter portion being provided with a plurality of spaced, parallel, transverse openings spanning the width of the gully bottom.

The dam additionally provides a plurality of spaced, parallel barriers or headers spanning the width of the gully bottom and positioned in said transverse openings of the basin mesh portion of the open mesh member, each of these barriers projecting above the open mesh member and presenting an impermeable upstream face. Preferably, these barriers include a floor block header positioned just immediately downstream of said bar mat for dissipating the energy of the run-off water as it moves downstream, and a basin sill header positioned near the downstream end of said basin mesh portion for dissipating the energy of the run-off water as it moves downstream and to direct this water in such a manner that it does not erode the gully bottom immediately forward thereof.

By virtue of such positioning of the bar mat, the open mesh member, and the barriers the velocity of the water flowing down the gully is reduced and silt particles, roots and other organic materials carried by the water are caused to settle out and collect below the mat thereby developing a silt bar and a pond of water above the silt bar. The silt bar and the surrounding area is spot sodded with water-tolerant grasses having a heavy fibrous root system, being capable of spreading by rhyzomes, readily adaptable to wet sites, and tolerant to silting whereby such grasses, by virtue of being protected by the bar mat whose open mesh permits growth, causes the development of a natural grass sod flume, thereby stabilizing the gully against erosion.

After accretion material has "filled in" to the top of the bar mat and vegetation is well established in the silt accumulation under the bar mat and in the bottom of the gully downstream from the bar mat, a second or supplemental bar mat, of a structure and shape similar to that of the aforedescribed bar mat may be installed thereon to develop maximum effective height. The second or supplemental bar mat, when installed, has its shorter base spanning the width of the gully bottom and is secured to the upper portion of the first bar mat, while its diagonal sides are set at angles corresponding to the slopes of the gully sides and are anchored thereto.

In the accompanying drawing

Figure 6:
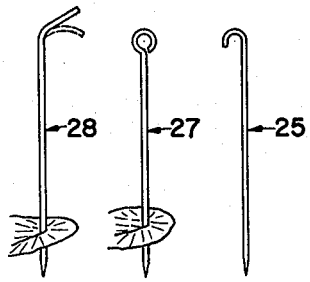
FIG. 6 is a detail view of various types of anchors.

Referring with more particularity to the drawing, the dam provides a trapezoidally-shaped bar mat 11 constructed of a rigid material, preferably steel, and comprising transverse rods 12, 13, 14, and 15 to which are secured, preferably by welding, longitudinal rods 16, 17, 18, 19, and 20 to form a rigid open mesh network. The numbers of these transverse and longitudinal rods used may be varied as desired. Two longer diagonal rods 21 and 22 are attached to the side edges of the bar mat and provide the contact with the gully sides 23 and 24 respectively, of the gully banks, being anchored to these gully sides by a series of anchor posts 25, one of which is illustrated in FIG. 6, which are driven into the banks.

When installed in the gully, the bar mat is so placed that it slopes downwardly in the same direction as the water flows in the gully. As the sides of the banks of the gully quite often are sloped, the two diagonal rods lay flush against each side of the gully banks, respectively. The bar mat is preferably fabricated in such a manner that when placed in position the longitudinal rods are under the transverse rods, thus strengthening the mat and permitting free movement of organic and trashy materials toward the downstream end of the mat and of the dam developed by it. The bar mat is further positioned so that the lower transverse rod 12 of the mat lays across and flush with the gully bottom 26 and the hooks of the upper end of anchor posts 25 are hooked over the rods and are driven vertically into the gully sides and gully bottom in such a manner that the diagonal rods and the lower transverse rod 12 are anchored firmly to the gully banks and gully bottom, respectively, thus installing the bar mat at an acute angle, preferably at an angle of about 18° to the gully bottom facing the upstream direction. A modified spiral anchor 27 having an eye-type end or a spiral anchor 28 having a bendable hook-type end, as illustrated in FIG. 6, may be used under certain conditions to hold either of the diagonal rods or the lower transverse rod 12 in place, these spiral anchors being screwed into position. Anchor 28 differs from anchor 27 only in the method of contact with the rods to be held in place, tie-wires being used with anchor 27 while the top of anchor 28 is bendable over the rods. By such positioning of the bar mat, run-off waters carrying silt, roots, and other organic materials are retarded as they pass through the openings of the bar mat and portions of these materials drop out of suspension in the water and are collected between the mat and the gully bottom.

The dam also provides a flume mesh 30, made of cotton or jute mesh or material of a similar nature. This flume mesh is laid under, and upstream of, the bar mat and the diagonal rods in direct contact with the gully bottom and the sides of the banks, and is fastened flush with the gully bottom and gully sides with wire pins.

Figure 7:
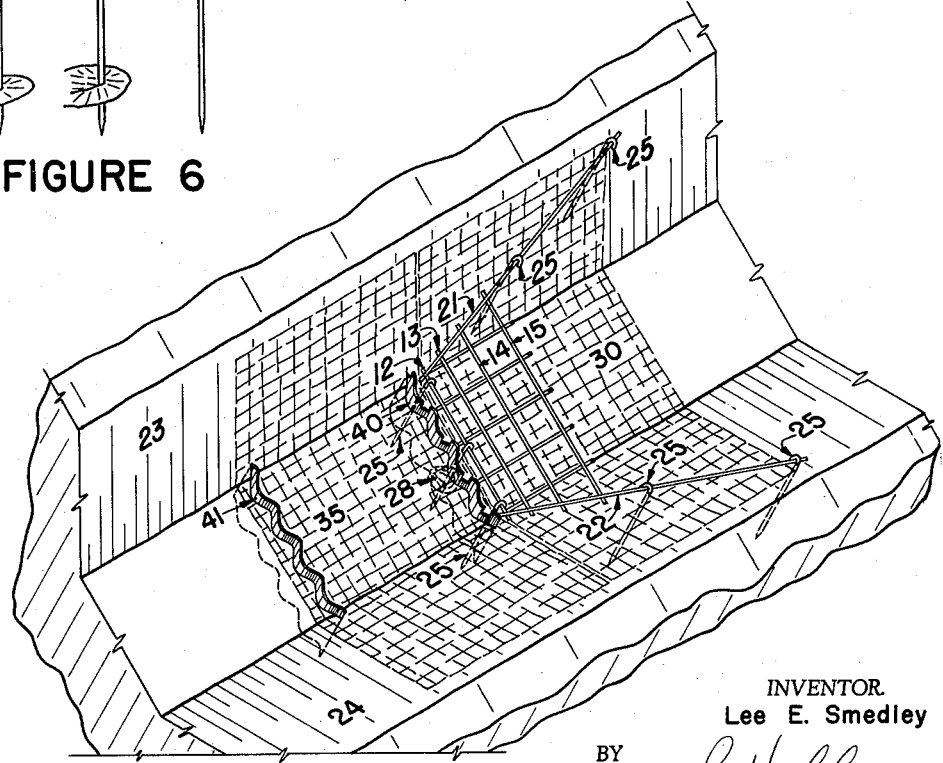
FIG. 7 is a schematic plan view of the installed bar mat and associated parts.

The dam further provides a basin mesh 35, also made of cotton or jute mesh, which is positioned immediately below, that is, downstream from, the bar mat assembly, and is placed directly on the gully bottom and the gully sides, as shown in FIG. 7, for example. It is fastened flush to the ground with wire pins. In some instances, this basin mesh 35 may be continuous with flume mesh 30.

Figure 1:
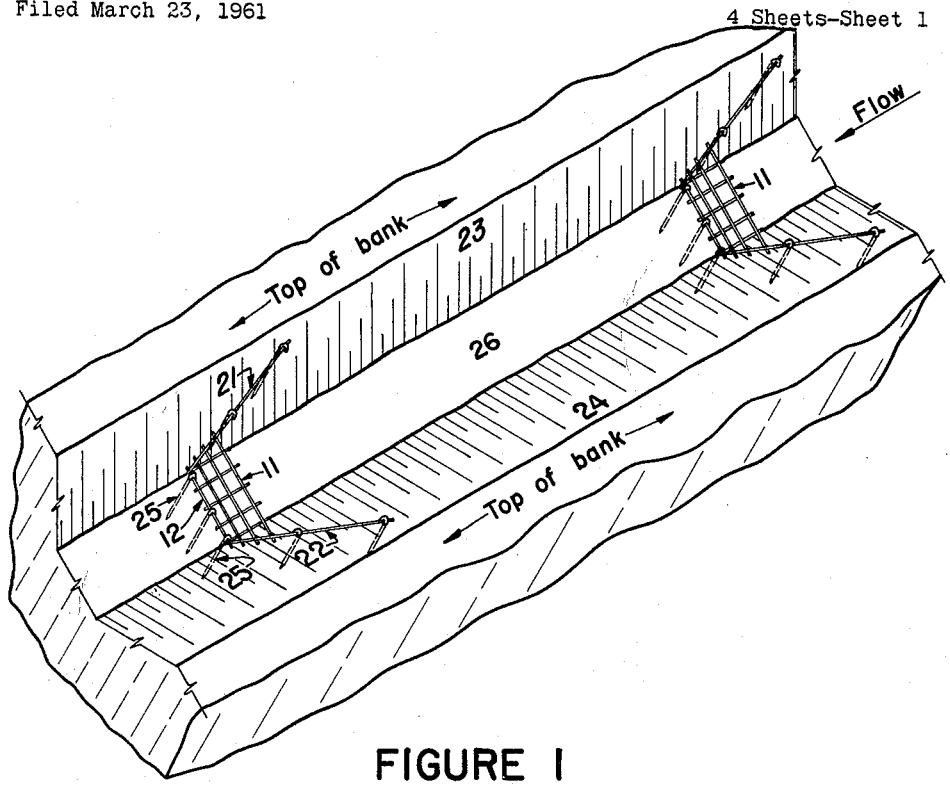
FIG. 1 is a schematic plan view illustrating two installations of a bar mat in a gully.
Figure 2:
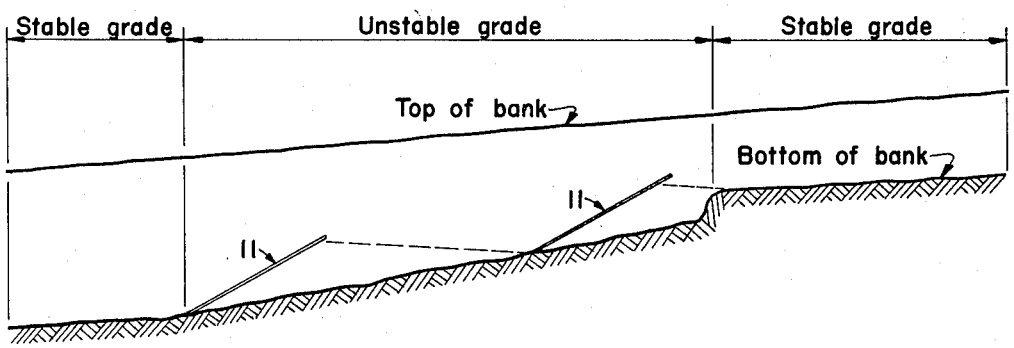
FIG. 2 is a schematic profile view showing the top of a bank and the flow line of a gully with two installations of the dam in place.
Figure 3:
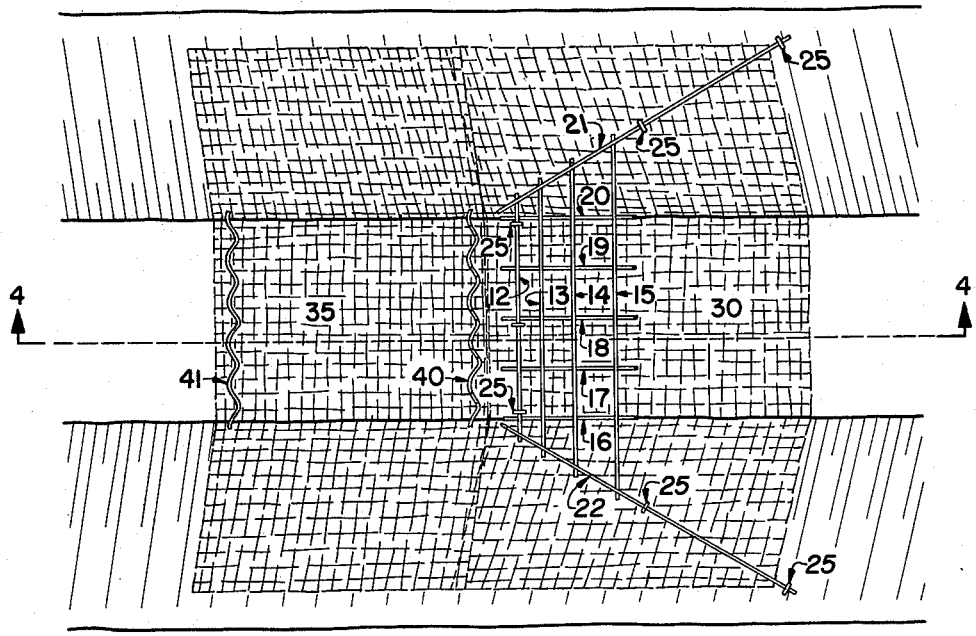
FIG. 3 is a schematic plan view of the installed bar mat and associated parts.
Figure 4:
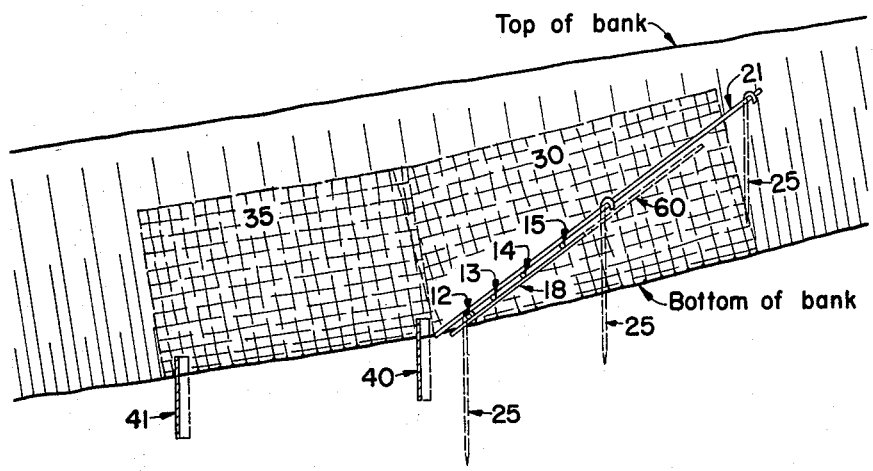
FIG. 4 is a view along the line 4—4 of FIG. 3, in which view, however, has been added the second or supplemental bar mat not illustrated in FIG. 3.
Figure 8:
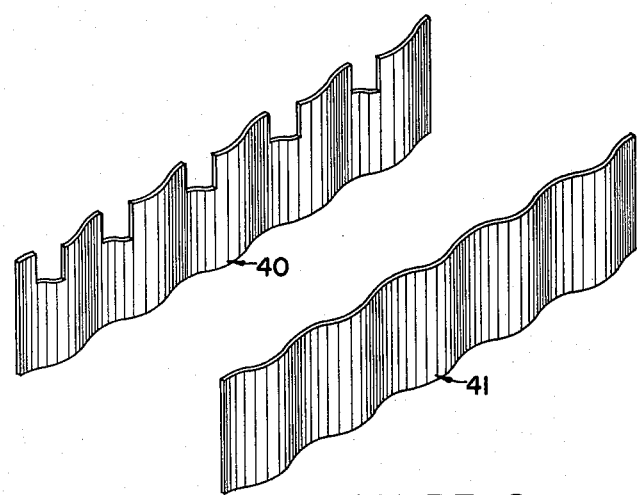
FIG. 8 is a view illustrating the floor block and basin sill headers.

The dam also includes a first barrier, such as floor block header 40, preferably constructed of corrugated metal, which is shaped and placed below, that is downstream from, the transverse rod 12 of the bar mat and which, by presenting an impermeable upstream face, performs the function of energy dissipation of water as it moves downstream and from the short flume established by the bar mat. A second barrier, such as basin sill header 41, similar to floor block header 40, is also provided, this basin sill header, also being preferably constructed of corrugated metal, being shaped and placed downstream of basin mesh 35 and which, by also presenting an impermeable upstream face, serves to dissipate the energy of the water moving downstream and to direct this water in such a manner that it does not erode the bottom of the gully immediately below. Both the floor block header 40 and the basin sill header 41 are illustrated in FIG. 8, being shown in position in the dam in FIGS. 3, 4, and 7.

Figure 5:
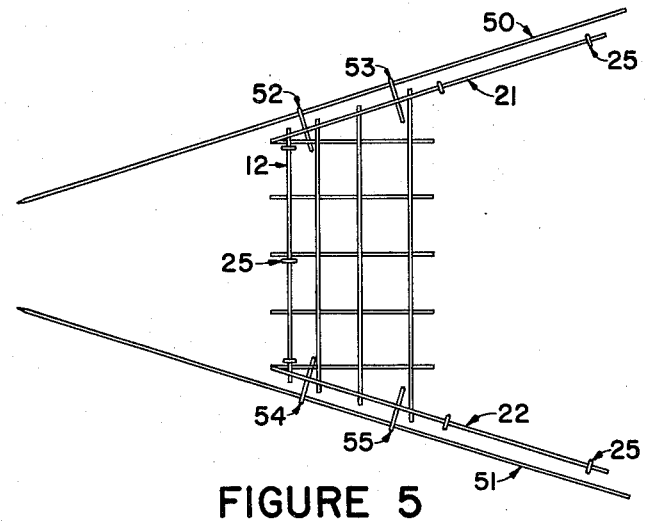
FIG. 5 is a schematic plan view illustrating a modification of the bar mat and a variation of anchoring means.
Figure 9:
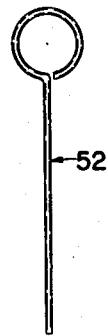
FIG. 9 is a view of an eye-bolt used in a modification of the anchoring means.

In FIG. 5, a modified form of bar mat is illustrated wherein the method of anchoring in the gully utilizes long diagonal anchor bars 50 and 51 which are inserted through similar eye bolts 52 and 53 and through 54 and 55, respectively, one such eye bolt being illustrated in FIG. 9, the eye bolts, in turn being fastened, as by welding, to the bar mat. The two long diagonal anchor bars 50 and 51 are then driven downwardly at an angle so that when in final position, the lower ends are well below the bottom of the gully.

The bar mat and associated parts, as described above, can be assembled and installed in a gully in the following manner: A prefabricated bar mat of a bottom width appropriate to the gully bottom width and with the diagonal rods set at angles appropriate to the side slopes of the gully when bar mat is placed at the preferred angle, e.g., 18°, to the gully bottom, is selected. The bar mat is placed in the approximate position it is to occupy and at the prescribed angle in the gully. The sides of the gully are shaped along the lines of the diagonal rods only, so that the rods are in contact with the sides along their entire length. The bar mat is then removed. The flume mesh and basin mesh are then placed and secured flush with the bottom and sides of the gully with wire pins. The bar mat is then replaced in position and secured with post anchors and spiral anchors as prescribed. Spiral anchors are screwed into position; post anchors are driven. The positions for the floor block header and the basin sill header are located and the mesh cut transversely across the channel bottom on these lines to define spaced, parallel, transverse openings spanning the width of the gully bottom. The headers are then placed by driving them into position through these openings with a portion thereof projecting above the mesh and presenting an impermeable upstream face. Any loose ends of mesh adjacent to the headers are secured as necessary with wire pins.

As a result of this positioning of the bar mat, the velocity of water flowing down the gully is reduced and soil particles, roots and other organic materials carried by the flowing waters are caused to settle out and collect below the bar mat. These materials accumulate to develop a silt bar immediately above the bar mat as well as a small pond of water above the silt bar, the depth of the silt bar being controlled by the slope of the mat and the spacing of the rods of the bar mat. This combination of soil particles, which is often topsoil from the adjacent area and high in fertility, organic matter, and humus, the rigid mat holding it in place, and the water trapped above it, provide ideal conditions for establishment of selected water-tolerant grasses, as for example, grass sod having a heavy fibrous root system, being capable of spreading by rhyzomes, readily adaptable to wet sites, and tolerant to silting. Thus, these sodded grasses are protected by the bar mat whose open mesh permits grass growth and soon provides a natural grass sod flume at the approximate location of the bar mat, giving the gully or channel bottom permanent stabilization.

After there is an accumulation of silt, roots, and other organic matter above the bar mat, such accumulations usually requiring two or three discharges of run-off waters down the gully, the sod-forming, water-tolerant grasses are transplanted into the silt area above the bar mat and also into the area immediately downstream from it. These grass spots or sprigs should be planted in such a manner that they will receive the maximum protection from the bar mat and from the flume and basin meshes, until they become established.

Under certain conditions seeding of grasses may take the place of or supplement sodding and sprigging in establishing vegetative cover.

Figure 10:
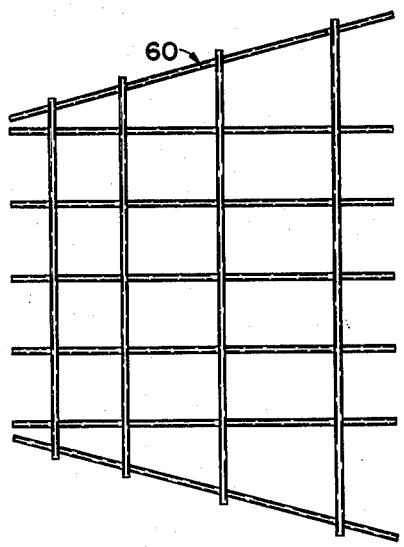
FIG. 10 is a schematic plan view of the second or supplemental bar mat.

After accretion material has "filled in" to the top of the upper transverse rod 15, and after vegetation is well established in the silt accumulation under the bar mat and in the bottom of the gully downstream from the bar mat, a second or supplemental bar mat 60 may be inserted on the bar mat 11 to develop maximum effective height. Such supplemental bar mat insert is shown in FIG. 10 and is illustrated in position in FIG. 4 (not being shown, however, in FIG. 3).

The resulting dam which is extremely stable due to angle of installation, effectively traps and holds topsoil at or near the gully bottom yet permits large flood water flows to pass over the bar mat and these trapped sediments without turbulence and associated erosion, promotes lush growth of selected vegetation in these trapped sediments, gives protection to this vegetation until well established because of the openings in the bar mat, and provides intermittent sub-irrigation for these plants from the water temporarily stored above the silt accumulation. Thus, these established vegetative flumes provide effective "let downs" in the unstable gully and thereby provide stability by stopping degrading of the bottom of the gully and the lateral erosion of the banks.

I claim:
1. In combination, a gully having a bottom and sides, and a dam for stabilizing the gully against erosion, said dam comprising
 (a) a rigid, open-mesh trapezoidally-shaped bar mat, positioned in the gully at an acute angle to the gully bottom facing the upstream direction, having its shorter base spanning the width of, and anchored to, the gully bottom, and having its diagonal sides set at angles corresponding to the slopes of the gully sides and anchored thereto;
 (b) an open mesh member covering the bottom and sides of the gully and anchored thereto, said member being positioned under the bar mat with a portion thereof extending upstream of the bar mat and a portion thereof extending downstream of the bar mat, the latter portion being provided with a plurality of spaced, parallel, transverse openings spanning the width of the gully bottom; and
 (c) a plurality of spaced, parallel barriers spanning the width of the gully bottom and positioned in said transverse openings of that portion of the open mesh member downstream of the bar mat, said barriers projecting above the member and presenting an impermeable upstream face.

2. In combination, a gully having a bottom and sides, and a dam for stabilizing the gully against erosion, said dam comprising
 (a) a first rigid, open-mesh trapezoidally-shaped bar mat, positioned in the gully at an acute angle to the gully bottom facing the upstream direction, having its shorter base spanning the width of, and anchored to, the gully bottom, and having its diagonal sides set at angles corresponding to the slopes of the gully sides and anchored thereto;
 (b) an open mesh member covering the bottom and sides of the gully and anchored thereto, said member being positioned under the bar mat with a portion thereof extending upstream of the bar mat and a portion thereof extending downstream of the bar mat, the latter portion being provided with a plurality of spaced, parallel, transverse openings spanning the width of the gully bottom;
 (c) a plurality of spaced, parallel barriers spanning the width of the gully bottom and positioned in said transverse openings of that portion of the open mesh member downstream of the bar mat, said barriers projecting above the member and presenting an impermeable upstream face; and
 (d) a second bar mat of a structure and shape similar to that of said first bar mat, having its shorter base spanning the width of the gully bottom and secured to the upper portion of the first bar mat, and having its diagonal sides set at angles corresponding to the slopes of the gully sides and anchored thereto.

References Cited by the Examiner
UNITED STATES PATENTS

| | | | |
|---|---|---|---|
| 224,398 | 2/80 | Currie | 61—3 |
| 1,849,323 | 3/32 | Cleveland | 61—3 |
| 2,162,499 | 6/39 | Borhek. | |
| 2,178,863 | 11/39 | Pepper. | |
| 2,341,515 | 2/44 | Rehfeld | 61—3 |

FOREIGN PATENTS

| | | |
|---|---|---|
| 835,238 | 9/38 | France. |
| 118,377 | 4/44 | Australia. |
| 725,939 | 3/55 | Great Britain. |

OTHER REFERENCES

Engineering News Record (publication), August 3, 1933, pages 133–137.

JACOB L. NACKENOFF, *Primary Examiner.*
WILLIAM I. MUSHAKE, EARL J. WITMER,
*Examiners.*